(12) United States Patent
Snell et al.

(10) Patent No.: US 7,338,605 B2
(45) Date of Patent: *Mar. 4, 2008

(54) FILTER AID AND METHOD OF USING SAME FOR RECLAIMING WATER-BASED FLUIDS USED IN METAL WORKING PROCESSES

(75) Inventors: Darrell Snell, Benicia, CA (US); J. Howard Adams, Crockett, CA (US)

(73) Assignee: J.R. Schneider Co., Inc., Benicia, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 11/276,083

(22) Filed: Feb. 13, 2006

(65) Prior Publication Data

US 2006/0124560 A1    Jun. 15, 2006

Related U.S. Application Data

(62) Division of application No. 10/605,301, filed on Sep. 22, 2003, now abandoned.

(60) Provisional application No. 60/411,951, filed on Sep. 20, 2002.

(51) Int. Cl.
*B01D 37/02*    (2006.01)
*B01D 37/03*    (2006.01)

(52) U.S. Cl. ............... 210/714; 210/728; 210/735; 210/778; 210/797; 508/111; 516/136; 516/180

(58) Field of Classification Search ............... 210/778
See application file for complete search history.

(56) References Cited

U.S. PATENT DOCUMENTS

| | | | |
|---|---|---|---|
| 3,233,741 A * | 2/1966 | Bell | 210/500.1 |
| 3,242,073 A | 3/1966 | Guebert et al. | |
| 3,771,989 A | 11/1973 | Pera et al. | |
| 4,177,142 A * | 12/1979 | Halbfoster | 210/681 |
| 4,238,334 A | 12/1980 | Halbfoster | |
| 4,309,247 A | 1/1982 | Hou et al. | |
| 4,366,068 A | 12/1982 | Ostreicher et al. | |
| 4,544,491 A * | 10/1985 | Tyson et al. | 210/772 |
| 4,594,158 A | 6/1986 | Chong et al. | |
| 4,710,298 A * | 12/1987 | Noda et al. | 210/505 |
| 4,734,208 A | 3/1988 | Pall et al. | |
| 4,859,340 A | 8/1989 | Hou et al. | |
| 4,927,550 A | 5/1990 | Cutcher et al. | |
| 4,981,591 A * | 1/1991 | Ostreicher | 210/502.1 |
| 5,122,281 A | 6/1992 | Schneider et al. | |
| 5,154,828 A * | 10/1992 | Schneider et al. | 210/501 |
| 5,200,086 A * | 4/1993 | Shah et al. | 210/708 |
| 5,284,634 A | 2/1994 | Strominger et al. | |
| 5,346,624 A | 9/1994 | Libutti et al. | |
| 5,718,827 A | 2/1998 | Rydell et al. | |
| 6,191,077 B1 * | 2/2001 | Baumgartner et al. | 508/111 |
| 6,358,423 B1 * | 3/2002 | Barten et al. | 210/709 |
| 6,537,614 B1 | 3/2003 | Wet et al. | |
| 6,616,835 B2 | 9/2003 | Jensen | |
| 6,660,172 B2 | 12/2003 | Koslow | |
| 2003/0168401 A1 | 9/2003 | Koslow | |

FOREIGN PATENT DOCUMENTS

WO    01/32329 A2    5/2001

\* cited by examiner

*Primary Examiner*—Peter A. Hruskoci

(57) ABSTRACT

A filter aid and a method of using the same are disclosed that effectively removes contaminants from water-based metal forming liquids used in aluminum forming, rolling and other metal working processes. The filter aid includes a cellulosic material and a cationic polymer flocculating agent that is mixed with contaminated metal working fluid for a predetermined amount of time. The contaminated metal working fluid is then filtered through the filter aid, thereby removing the substantially all of the contaminants therein and allowing purified metal working fluid to return to the process system without carrying contaminants that will harm the surfaces of the metal being worked and the device that forms them. An acid material may be optionally added to the metal forming liquid, the acid serving to maintain the pressure and flow rate at normal levels by controlling clogging in the filter.

1 Claim, No Drawings

FILTER AID AND METHOD OF USING SAME FOR RECLAIMING WATER-BASED FLUIDS USED IN METAL WORKING PROCESSES

RELATED APPLICATION DATA

This is a divisional application of U.S. non-provisional patent application Ser. No. 10/605,301 filed Sep. 22, 2003, now abandoned which claims priority to U.S. provisional patent application No. 60/411,951 filed Sep. 20, 2002. The entire disclosures of U.S. non-provisional patent application Ser. No. 10/605,301 and U.S. provisional patent application No. 60/411,951 are hereby incorporated herein by reference. In addition, this application is related to U.S. non-provisional patent application Ser. No. 10/904,219 and entitled "FILTER AID AND METHOD OF USING SAME FOR RECLAIMING WATER-BASED FLUIDS USED IN METAL WORKING PROCESSES".

BACKGROUND OF INVENTION

1. Field of the Invention

This invention generally relates to a filter aid for removing contaminants from water-based fluids used in metal working processes, as well as a method of using the same.

2. Background Information

Metal working fluids are commonly used for purposes of cooling, lubricating and/or cleaning metal during metal working processes such as cutting, grinding, forming, rolling, and the like. Fluids used for such purposes generally include petroleum derived compositions, oil-in-water emulsions, non-petroleum water soluble (synthetic) compositions, and synthetic emulsions, or combinations thereof. Emulsified oil-in-water type metal working fluids typically comprise about 1-10% by weight of lubricants in combination with a small amount of an emulsifier, such as hydrogenated animal fat, sodium sulfonate complexes and the like, and about 90% or more by weight of water. Synthetic metal working fluids on the other hand typically comprise mixtures of a water miscible organic polymer in combination with borates and suitable wetting agents. As used herein, unless otherwise specifically noted, the term "metal working fluid" refers to oil-in-water emulsions that contain various combinations of water, emulsified oils, and other synthetic compositions.

Depending upon the particular metal working process, the metal working fluids typically become contaminated over a period of time with foreign matter such as metal particles (ferrous or non-ferrous), tramp oil, dirt, bacteria, and other foreign matter. For example, during the manufacturing of two-piece aluminum containers, e.g., beverage cans, a metal working fluid is continuously circulated within the can forming machinery in order to cool the forming tools used therein, provide lubrication, and to carry off unwanted waste aluminum particles. For economical reasons, this metal working fluid is continuously recirculated through the can forming machines. However, the metal working fluid gradually becomes contaminated with the waste aluminum particulates, tramp oil, and other contaminants. These contaminates are detrimental to the can forming process and the machinery used therewith, and thus the metal working fluid must be filtered in order to remove the contaminants.

For example, a liquid filtering device (such as that described in U.S. Pat. No. 3,608,734) is typically used to filter the recirculated metal working fluid. In this device, the contaminated metal working fluid is furnished to an input chamber located on the upstream side of a support structure that has a filter media supported thereon (such as that described in U.S. Pat. No. 4,925,560). The metal working fluid passes through the filter media and support structure to a collection chamber on the downstream side of the filter sheet. Contaminants in the coolant are collected in the filter media and clean metal working fluid is accumulated in collection chamber. Before and during the filtering process, a filter aid material (such as sawdust, wood pulp, or other cellulosic material) is added to and mixed with the contaminated metal working fluid in order to build up a cake on the filter media to enhance the filtering process.

Although the combination of the filter aid material and the filter media can successfully remove some of the contaminants in the metal working fluid, it is still quite porous and thus will allow smaller metal particles to pass therethrough. Thus, despite this filtration, this metal working fluid will change from a clear to opaque color to a dark gray color after 24 to 48 hours of use as it becomes more and more contaminated. This contamination, particularly the smaller metal particles that remain in the metal working fluid, can have a quite deleterious effect on the machinery in which it is used.

For example, in the aluminum beverage can forming machine noted above, aluminum particles generated during can making operations are generally between approximately 0.1 to 5 microns in diameter, but a conventional filter sheet used to remove these aluminum particles has an average pore size of approximately 5 to 20 microns. Even if a cake of the filter aid material is formed on the filter sheet, the average pore size of the filter will still be between approximately 2.5 to 5.0 microns. However, this reduced pore size will usually only be present during the last 20% of the filter cycle. Thus, a significant amount of the aluminum particles in the metal working fluid will simply pass through the filter, will cause premature wear in the moving parts in the machine, and both shorten the useful life of these parts and increase operating costs.

In addition, in the aforementioned aluminum beverage can forming machine, microscopic droplets of tramp oil in the metal working fluid will also pass through the filter, and adhere to the beverage cans produced by the can machine. This of course is highly undesirable as it increases costs associated with cleaning the cans.

Furthermore, although the use of the aforementioned filter aid material enhances the filtering process, it has a drawback in that the filter will eventually become clogged after the filter aid material becomes saturated with metal particles, tramp oil, and other contaminates. This of course requires the filter to be frequently replaced, which in turn will increase operating costs.

There have been some efforts in the past to address these problems with respect to aqueous fluids (i.e., solutions that are not oil-in-water emulsions), and also with respect to non-aqueous fluids (e.g., solutions composed primarily of petroleum-based lubricants).

For example, U.S. Pat. No. 4,177,142 (the '142 patent) discloses a filter bed composed of a mixture of cellulose fibers and a cationic organic polyelectrolyte, and a method of using the same. This reference states that this combination shows effectiveness in removing iron oxide from an aqueous fluid, and also states that that this combination reduces the pressure drop across the filter and increases filtration efficiency due to the "clumping" phenomenon. This reference states that the "clumping" phenomenon occurs because the cellulose fibers and the cationic organic polyelectrolyte have opposite electric charges, and thus agglomerate together to form larger particles when in aqueous solution. When these larger particles are formed into a filter bed, a greater void space (pore size) is created between the particles in the filter bed and thus aqueous fluids can more readily pass through the filter bed. However, although the '142 patent teaches that a cationic organic polyelectrolyte can be used to produce the "clumping" phenomenon, it is clear that this cannot include all cationic organic polyelectrolytes known in the art because not all of these compounds will produce a "clumping" phenomenon when combined with cellulose fibers in all types of liquids. For example, some cationic organic polyelectrolytes will clump in an aqueous environment, but will not clump in an oil-in-water emulsion. Furthermore, it should be noted that the '142 patent is silent with respect to the use of the combination of cellulose fibers and a cationic organic polyelectrolyte to filter oil-in-water emulsions contaminated with metal particles. Indeed, it has long been believed by those of ordinary skill in the art that this combination would be unacceptable for use as a filter to remove metal particles, tramp oil, and other contaminants from an oil-in-water emulsion. This is because it was believed that the oil in the oil-in-water emulsion would quickly clog the filter, and thus eliminate any improvement in pressure drop and filtration efficiency that the invention in the '142 patent provided.

In addition, U.S. Pat. No. 5,154,828 (the '828 patent) discloses a filter aid material composed of cellulose fibers treated with an acid material for reclaiming and maintaining a coolant oil (i.e., a non-aqueous fluid) used in aluminum rolling or working processes, and a process for using the same. This reference states that this combination shows effectiveness in removing aluminum oxide from a non-aqueous fluid. However, the '828 patent is silent with respect to the use of the combination of cellulose fibers and an acid material to filter oil-in-water emulsions contaminated with metal particles. Indeed, it has long been believed by those of ordinary skill in the art that this combination would be unacceptable for use in an oil-in-water emulsion because the acid material would quickly leach out of the cellulose fibers due to the presence of water, and thus prevent the slow, controlled reaction between the aluminum and the acid material described as critical in the '828 patent.

In view of the above, there exists a need for a filter aid material and a method of using the same which overcomes the above mentioned problems in the prior art. This invention addresses this need in the prior art as well as other needs, which will become apparent to those skilled in the art from this disclosure.

SUMMARY OF INVENTION

The inventors of the present invention were able to overcome the aforementioned problems in the prior art, and develop a filter aid and a method of using the same that is a significant advance in filtration technology. Contrary to conventional belief, the inventors surprisingly and unexpectedly found that a cellulose material treated with a cationic polymer flocculating agent can be utilized to remove metal particles, tramp oil and other contaminants from a metal working fluid composed of an oil-in-water emulsion without causing a rapid increase in the pressure drop across the filter and a rapid decrease in filtration efficiency. The cationic polymer flocculating agent in the filter aid works together with the cellulosic material to filter out contaminants in the metal working fluid that would simply pass through filters typically used in metal working fluid filtering systems, and removes over 95% of the metal particles in the contaminated metal working fluid.

Furthermore, contrary to conventional belief, the inventors surprisingly and unexpectedly found that the addition of a acid material to the mixture of filter aid and metal working fluid after the pressure drop across the filter reaches a predetermined level will dissolve contaminants in the filter aid and filter and thus lower the pressure drop across the filter to a more optimal level.

Finally, the inventors of the present invention surprisingly and unexpectedly discovered that a filter cake composed of the filter aid of the present invention can be treated with dilute sodium hydroxide when the addition of the acid material to the filter aid is no longer able to improve filtration efficiency. Because this treatment removes contaminants from the filter cake, it allows the filter cake to be recycled by adding more of the filter aid of the present invention, and/or allows the filter cake to be disposed of in an environmentally sound manner.

These and other objects, features, aspects and advantages of the present invention will become apparent to those skilled in the art from the following detailed description, which discloses preferred embodiments of the present invention.

DETAILED DESCRIPTION

The present invention is a filter aid comprised of a cellulosic material and a cationic polymer flocculating agent, and a method of using the same. The filter aid is employed in a conventional filtering system to filter contaminants from metal working fluids used in metal working processes. Unless otherwise noted, all percentages cited herein are percentages by weight of filter aid to metal working fluid.

It will be readily apparent to one of ordinary skill in the art that the filter aid of the present invention can be adapted for use in any filtering system used to filter contaminated metal working fluid. One example of a filtering system in which the filter aid material of the present invention can be employed is described in U.S. Pat. No. 3,608,734 (the '734 patent). In the filtering system disclosed therein, after being used in the metal working process, contaminated metal working fluid is furnished to an input chamber located upstream of a support structure (e.g. filter sheet) that supports a filter media. The metal working fluid passes through the filter media and support structure to a collection chamber downstream thereof. Contaminants in the metal working fluid are collected in the filter media and clean metal working fluid (i.e., coolant) is accumulated in a chamber downstream from the sheet. As will be more fully described below, the filter aid of the present invention will be added to the metal working fluid and allowed to react therewith for a predetermined amount of time before the metal working fluid is allowed to pass through the filter sheet.

As noted above, the filter aid of the present invention is comprised of a cellulosic material and a cationic polymer flocculating agent As used herein, the term "cellulosic material" is defined to include any material composed primarily of cellulose, and includes for example cotton fiber, saw dust, wood pulp, and powdered cellulose. These types of materials are readily available for commercial purchase, and are well known to one of ordinary skill in the art. Preferably, powdered cellulose is used in the filter aid of the present invention. In addition, the average length and average diameter of the cellulosic material is not particularly limited.

In addition, as used herein, the term "cationic polymer flocculating agent" is defined to include any cationic amine or imine salt polymer that is useful as a flocculating agent in an oil-in-water emulsion. However cationic polymer flocculating agents such as poly[oxyethylene(dimethylimino) ethylene(dimethylimino)ethylene dichloride], polydimethyldiallyl ammonium chloride, and tetraalkyl quaternary ammonium chloride have shown particular effectiveness in the present invention.

The ratio of cellulosic material to cationic polymer flocculating agent present in the filter aid of the present invention will vary depending upon the metal working fluid to be filtered, the type of cationic polymer flocculating agent used, and other variables, but is generally in a range between approximately 5:1 and 30:1. The exact ratio of cellulosic material to cationic polymer flocculating agent to be used in any given situation can be readily determined by one of ordinary skill in the art through routine experimentation. In addition, the cellulosic material may be combined with the cationic polymer flocculating agent by any number of means well known to those of ordinary skill in the art. For example, the cellulosic material may be mixed into a quantity of water, and then combined with the desired cationic polymer flocculating agent. This slurry can then be used as is, or can be dewatered for use at a later time. Alternatively, the cellulosic material and the cationic polymer flocculating agent may be added to the metal working fluid separately.

As noted above, the filter aid of the present invention can be used in a number of different conventional filtering systems. In these conventional filtering systems, contaminated metal working fluid is pumped to an input chamber located upstream of a filter sheet after being used in the metal working process. However, in the method of the present invention, the filter aid of the present invention is first mixed with the metal working fluid and allowed to react therewith for a predetermined amount of time before the metal working fluid is allowed to flow through the filter sheet to the collection chamber downstream.

Preferably, between approximately 0.5 and 3.0 wt % of the filter aid is mixed with contaminated metal working fluid, and more preferably, approximately 1.3 wt % (i.e., 1 lb. of filter aid to each 9.3 gallons of contaminated metal working fluid). After adding the filter aid of the present invention to the contaminated metal working fluid, the filter aid must be allowed to react with contaminated metal working fluid from between approximately 1 to 15 minutes, and more preferably, between approximately 2 to 5 minutes, before allowing the mixture of the filter aid and the contaminated metal working fluid to flow through the filter sheet. It should also be noted that the metal working fluid is preferably between approximately 70 and 140° F., and has a pH of between approximately 6 to 11. Generally speaking, the filter aid must be allowed to react with the contaminated metal working fluid longer as the temperature of the metal working fluid decreases. However, particularly good results were noted when the temperature of the metal working fluid was 115° F. and the filter aid was allowed to react with the contaminated metal working fluid for 2 minutes. During the time that the filter aid is allowed to react with the contaminated metal working fluid, the cationic polymer flocculating agent will react with the contaminants in the metal working fluid and form a floc that will precipitate out of the metal working fluid.

After the filter aid has been allowed to react with the contaminated metal working fluid for the required amount of time, the filter aid, the metal working fluid and the floc are then allowed to flow through a filter sheet to a collection chamber. It should be noted that the filter sheet used in conjunction with the filter aid of the present invention is not particularly limited. However, good results have been obtained with filter sheets having an average pore size of between 5 and 20 microns. As the metal working fluid flows through the filter sheet, the filter aid in the metal working fluid will form a filter cake on the upstream side of the filter sheet, the filter cake and the filter sheet will filter the floc and other contaminants from the metal working fluid, and purified metal working fluid will flow into a collection chamber and be recycled for use in the metal working process. At the end of this filtration process, the inventors surprisingly and unexpectedly found that the filter aid and method of the present invention removed over 95% of the metal particles found in the contaminated metal working fluid, and substantially all of the tramp oil.

The method of the present invention may also optionally comprise the step of supplying an acid material to the mixture of the filter aid and the contaminated metal working fluid. As noted above, the floc created by the filter aid and other contaminants not precipitated out of metal working fluid by the filter aid will eventually begin to clog the filter cake and filter sheet, and thus increase the pressure drop across the filter and decrease filtration efficiency. However, the inventors surprisingly and unexpectedly discovered that the filter cake and filter sheet could be rapidly returned to its normal operating efficiency (i.e., the pressure drop and filtration efficiency could be rapidly returned to normal values) by supplying a small amount of an acid material to the mixture of the filter aid and metal working fluid while this mixture is being filtered. The acid material suitable for use in the present invention is not particularly limited, however acids such as sulfuric acid, salicylic acid, fumaric acid, and citric acid have shown particular effectiveness. The amount of acid material to be added to the metal working fluid will depend upon the acid material selected, the type of metal working fluid, and a number of other factors understood by one of ordinary skill in the art. However, good results have been achieved with the addition of approximately 0.1 wt % of citric acid to a coolant containing an oil-in-water emulsion used in aluminum beverage can forming machines. Finally, it should be noted that the amount of pressure drop across the filter that is necessary before the acid material can be added to the metal working fluid is not particularly limited. However, good results were obtained when the acid material was added after the differential pressure increased to 15 psid.

Another method of adding an acid material is by adding approximately 0.5 to 0.7 wt % of a cellulosic material permeated with citric acid (as described in U.S. Pat. No. 5,154,828), and may be preferable in situations in which one wants to add additional cellulosic material to the metal working fluid in order to increase filter life. For example, the inventors treated a coolant containing an oil-in-water emulsion used in a aluminum beverage can forming machine with 1.3 wt % of a cellulosic material and 0.2 wt % of a cationic flocculating agent for 10 minutes. During filtering, a pressure rise of 24 lbs. developed across the filter, which indicated filter clogging. 0.7 wt % of a filter aid containing 0.6 wt % cellulosic material treated with 0.1 wt % of citric acid was then added to the coolant. The pressure across the filter dropped from 24 lbs. to 17 lbs. in 1 min., and dropped to 10 lbs. in 10 min.

When the addition of additional acid material fails to improve filtration efficiency, then the filter cake may optionally be treated with dilute (1-3N) sodium hydroxide continuously until the coagulated solids on the filter cake are dissolved and the filter cake returns to its original white color. The addition of a small amount of a mixture of cationic polymer flocculating agent (0.05 wt %) and filter aid (0.5 wt %) to the cake will resume filter efficiency. In the alternative, the filter cake can be easily and inexpensively disposed of at this point, as the sodium hydroxide treatment will have removed much of the substances in the filter cake that would have otherwise classified the filter cake as a toxic waste and thus necessitated its disposal in a toxic waste dump.

EXAMPLES

Examples of the filter aid of the present invention and methods of using the same are provided below in Table 1, but should in no way be construed as limiting the scope of the present invention. The contaminated metal working fluid used in these examples was coolant taken from an aluminum can making plant (Plants A, B and E), an aluminum hot rolling mill (Plant C), and a steel sawing operation (Plant D). The filter sheet used with the coolant from Plants A-D is a filter paper laminated with melt-blown polypropylene fibers and has an average pore size of 10 microns (S375LMP, and available from PGI Corp). The filter sheet used with the coolant from Plant E is a straight spun bonded polypropylene filter sheet and has an average pore size of 20 microns (S320, and available from PGI Corp). The cellulosic material and the cationic polymer flocculating agent were pre-mixed before being added to the coolant (except where noted), and were allowed to react with the coolant for approximately 2-3 minutes. In Table 1, BH300 is a powdered cellulose fiber filter aid manufactured by International Fiber Corporation, H1075 is a cationic quaternary amine salt polymer supplied by Henkel Corp. and primarily composed of poly[oxyethylene(dimethylimino)ethylene(dimethylimino)ethylene dichloride], T732 is primarily composed of polydimethyldiallyl ammonium chloride supplied by Tramfloc, Inc., N8102 is tetraalkyl quaternary ammonium chloride manufactured by Ondeo Nalco, and B77 is Busan 77 supplied by Buckman Laboratories, and is primarily composed of poly[oxyethylene(dimethylimino)ethylene (dimethylimino)ethylene dichloride].

TABLE 1

| | Filter Aid | Cationic Polymer Flocculating Agent | Filtrate Clarity | Metal particles remaining in coolant (ppm) |
|---|---|---|---|---|
| Plant A | None | None | Dark Gray | 168 |
| Plant A | 2 wt % BH300 | None | Dark Gray | 154 |
| Plant A | 2 wt % BH300 | 0.2% H1075 | Clear | 4 |
| Plant A | 2 wt % BH300 | 0.3% T732 | Clear | 3 |
| Plant B | None | None | Dark Gray | 390 |
| Plant B | 2 wt % BH300 | 0.2% H1075 + 0.5% Salicylic Acid | Clear Light Yellow | 8 |
| Plant B | 2 wt % BH300 | 0.2% T732 | Trace Cloudy | 8 |
| Plant B | 2 wt % BH300 | 0.2% T732 + 0.8% Salicylic Acid | Clear Light Yellow | 3 |
| Plant B | 2 wt % BH300 | 0.2% N8102 | Slight Opaque | 11 |
| Plant C | None | None | Light Milky Gray | 21 |
| Plant C | 2 wt % BH300 | 0.25% B77 | Trace Cloudy Gray | 1 |
| Plant D | None | None | Mocha Cream | 58 |
| Plant D | 2 wt % BH300 | 0.2% B77 | Clear light brown | 11 |

The data above shows that mixing contaminated coolant with a cellulosic material alone reduced the metal particle content of the contaminated coolant only slightly and the solution remained a thick gray color. However, the data above clearly shows that mixing contaminated coolant with the cellulosic material plus approximately 0.1% to 0.3% of a cationic polymer flocculating agent reduced the metal particle content of the contaminated coolant by over 95% and yielded clear filtrates.

The terms of degree such as about and approximately as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A method for removing metal particles, tramp oil, and other contaminants from an oil-in-water emulsion produced in a metal working process, the method comprising:
   supplying a filter aid comprised of a cellulosic material and a cationic polymer flocculating agent to the oil-in-water emulsion to form a mixture;
   allowing the filter aid to react with the oil-in-water emulsion for a predetermined amount of time in order to form a floc therein;
   passing a flow of the oil-in-water emulsion mixture through the filter aid and a filter sheet in order to filter the floc and other contaminants from the oil-in-water emulsion;
   collecting filtered oil-in-water emulsion from the filter aid;
   supplying an acid material to the mixture of the oil-in-water emulsion and the filter aid after a predetermined pressure drop is detected across the filter sheet; and
   supplying dilute sodium hydroxide solution to the filter aid formed on the filter sheet after the acid material is supplied.

* * * * *